United States Patent
Lineton

(10) Patent No.: US 8,863,720 B2
(45) Date of Patent: Oct. 21, 2014

(54) COATED PISTON AND A METHOD OF MAKING A COATED PISTON

(71) Applicant: Federal-Mogul Corporation, Southfield, MI (US)

(72) Inventor: Warran Boyd Lineton, Ann Arbor, MI (US)

(73) Assignee: Federal-Mogul Corporation, Southfield, MI (US)

(*) Notice: Subject to any disclaimer, the term of this patent is extended or adjusted under 35 U.S.C. 154(b) by 0 days.

(21) Appl. No.: 13/664,778

(22) Filed: Oct. 31, 2012

(65) Prior Publication Data

US 2013/0118438 A1 May 16, 2013

Related U.S. Application Data

(60) Provisional application No. 61/553,529, filed on Oct. 31, 2011.

(51) Int. Cl.
| | | |
|---|---|---|
| *F02F 3/00* | (2006.01) | |
| *B05D 5/00* | (2006.01) | |
| *C25D 7/00* | (2006.01) | |
| *F02F 3/14* | (2006.01) | |
| *F02F 3/12* | (2006.01) | |
| *F02B 23/06* | (2006.01) | |

(52) U.S. Cl.
CPC ... *F02F 3/14* (2013.01); *B05D 5/00* (2013.01); *F05C 2201/0403* (2013.01); *F05C 2201/0427* (2013.01); *Y02T 10/125* (2013.01); *F02B 2023/0612* (2013.01); *C25D 7/00* (2013.01); *F02F 3/12* (2013.01); *F05C 2201/0424* (2013.01); *F05C 2201/0418* (2013.01); *F05C 2201/0421* (2013.01); *F02B 23/0603* (2013.01)

USPC .................................................... 123/193.6

(58) Field of Classification Search
USPC ............... 123/193.6; 427/287, 556; 428/677; 29/888.048, 888.04–888.042
See application file for complete search history.

(56) References Cited

U.S. PATENT DOCUMENTS

| | | | |
|---|---|---|---|
| 3,668,083 A | 6/1972 | Meyer et al. | |
| 3,911,891 A * | 10/1975 | Dowell | 123/669 |

(Continued)

FOREIGN PATENT DOCUMENTS

| | | |
|---|---|---|
| DE | 2545242 A1 | 4/1977 |
| DE | 2804562 A1 | 8/1979 |

(Continued)

OTHER PUBLICATIONS

International Search Report mailed Apr. 17, 2013 (PCT/US2012/062667).

(Continued)

*Primary Examiner* — Hung Q Nguyen
(74) *Attorney, Agent, or Firm* — Robert L. Stearns; Dickinson Wright, PLLC

(57) ABSTRACT

A piston for a diesel internal combustion engine including a crown portion at least partially formed of steel and having a combustion surface with a combustion bowl formed therein is provided. The combustion bowl presents a combustion bowl rim area, and a coating including at least one of a noble metal and a refractory metal is applied to substantially only the combustion bowl rim area. The coating is preferably applied in the areas of the combustion bowl rim area that are in line with the sprays of diesel fuel when the piston is in a top dead center position during operation of the engine.

14 Claims, 4 Drawing Sheets

(56) References Cited

U.S. PATENT DOCUMENTS

| | | |
|---|---|---|
| 4,185,593 A | 1/1980 | McClure |
| 4,530,340 A | 7/1985 | Totman |
| 4,811,707 A | 3/1989 | Pfefferle |
| 4,902,359 A | 2/1990 | Takeuchi et al. |
| 4,941,439 A * | 7/1990 | Wicen ............... 123/193.6 |
| 5,352,538 A | 10/1994 | Takeda et al. |
| 5,667,663 A | 9/1997 | Rickerby et al. |
| 6,240,912 B1 | 6/2001 | Stanglmaier et al. |
| 6,755,175 B1 | 6/2004 | McKay et al. |
| 6,877,473 B2 * | 4/2005 | Bischofberger et al. ... 123/193.6 |
| 7,029,721 B2 | 4/2006 | Hasz et al. |
| 7,259,351 B2 | 8/2007 | Lineton et al. |
| 7,383,807 B2 | 6/2008 | Azevedo et al. |
| 7,418,940 B1 | 9/2008 | Yi et al. |
| 7,458,358 B2 | 12/2008 | Lineton et al. |
| 2003/0196547 A1 | 10/2003 | Bischofberger et al. |
| 2007/0261663 A1 | 11/2007 | Lineton et al. |
| 2008/0149897 A1 * | 6/2008 | Burkle ...................... 252/389.1 |
| 2010/0154940 A1 | 6/2010 | Luft et al. |
| 2010/0275874 A1 | 11/2010 | Fujiwara et al. |
| 2011/0180032 A1 * | 7/2011 | Mungas et al. ............ 123/193.5 |

FOREIGN PATENT DOCUMENTS

| | | |
|---|---|---|
| DE | 9010077 U1 | 10/1990 |
| EP | 1188913 A1 | 3/2002 |
| GB | 2164701 A | 3/1986 |

OTHER PUBLICATIONS

Rubenstein "Electrochemical Metallizing Principles and Practice", Van Nostrand Reinhold Co., Inc. 1987, pp. 4, 6 and 50.

* cited by examiner

COATED PISTON AND A METHOD OF MAKING A COATED PISTON

BACKGROUND OF THE INVENTION

1. Field of the Invention

The subject invention is related to pistons, and more precisely, to steel pistons for diesel engines.

2. Related Art

Internal combustion engine manufacturers are encountering increasing demands to improve engine efficiencies and performance, including, but not limited to, improving fuel economy, improving fuel consumption, reducing oil consumption, increasing compression loads within the cylinder bores, decreasing weight and making engines more compact. Some of these demands may be achieved by increasing the temperature and pressure of the air/fuel mixture in the combustion chamber. It is thus important that the pistons in the engine be resistant to these increased temperatures and pressures.

In order to produce a piston which can operate in such an environment, many manufacturers have turned to forming pistons entirely of steel rather than entirely of aluminum or of both aluminum and steel. However, when exposed to the increased temperatures of combustion, steel may oxidize, which could dramatically reduce the piston's performance and durability. One process for reducing the risk of oxidation is to coat the piston with a cobalt or nickel based material. However, such an approach has its limits and may not be the most cost effective solution in all conditions.

SUMMARY OF THE INVENTION

According to an aspect of the present invention, a piston for a diesel engine is provided including a crown portion fabricated of steel and presenting a combustion surface having a combustion bowl with a bowl rim area. A coating including at least one of a noble metal and a refractory metal is selectively applied to at least a portion of the bowl rim area and substantially only to those selective portions of the bowl rim area. The oxidation resistant coating is advantageous because it protects the steel base metal of the piston from oxidation and also is able to resist the pressures and temperatures of combustion. The coating is preferably applied only to the portions of the upper surface of the piston in line with the fuel injectors when the piston is in a top-dead-center position. Thus, the material cost for the increased oxidation protection is minimized without compromising the utility of the piston.

Another aspect of the present invention provides for a method of making a piston for diesel engines including the step of preparing a crown portion of steel and having a combustion surface with a combustion bowl and a bowl rim area. The method continues with the step of selectively applying a coating including at least one of a noble metal and a refractory metal to substantially only the bowl rim area of the crown portion.

Yet another aspect of the present invention is a method of making a piston for diesel engines and wherein the step of selectively applying the coating onto the bowl rim area is further defined as electrodepositing the coating onto the bowl rim area of the crown portion with a wand applicator.

According to still another aspect of the invention, the metal applied to the piston is rhenium, a refractory metal which has a high melting temperature (3186° C.), is resistant to chemical attack and is neither overly ductile nor overly brittle.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
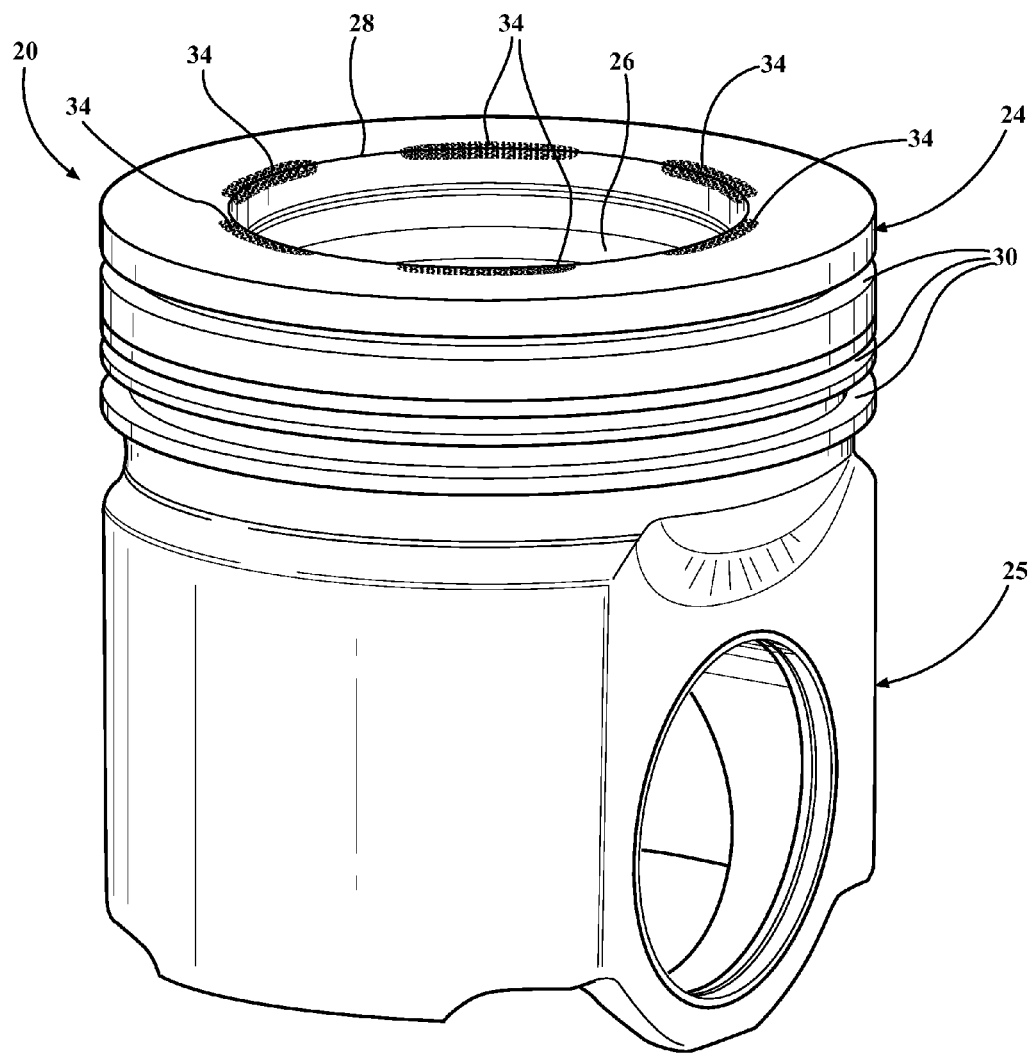
FIG. 1 is a perspective and fragmentary view of an exemplary piston and shown with circles indicating the areas coated with a noble metal.
Figure 2:
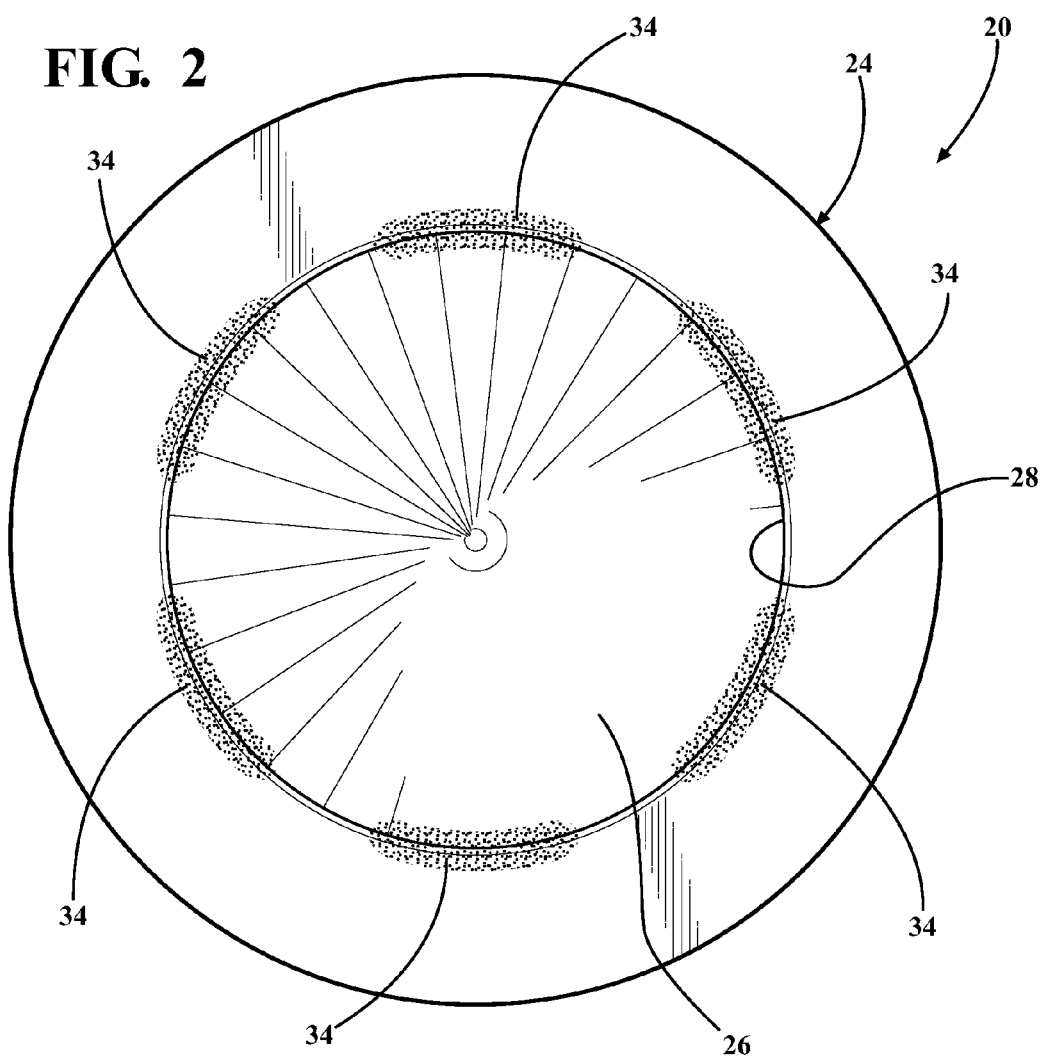
FIG. 2 is a top and elevation view of the exemplary piston and shown with circles indicating the areas to be coated with the noble metal.
Figure 3:
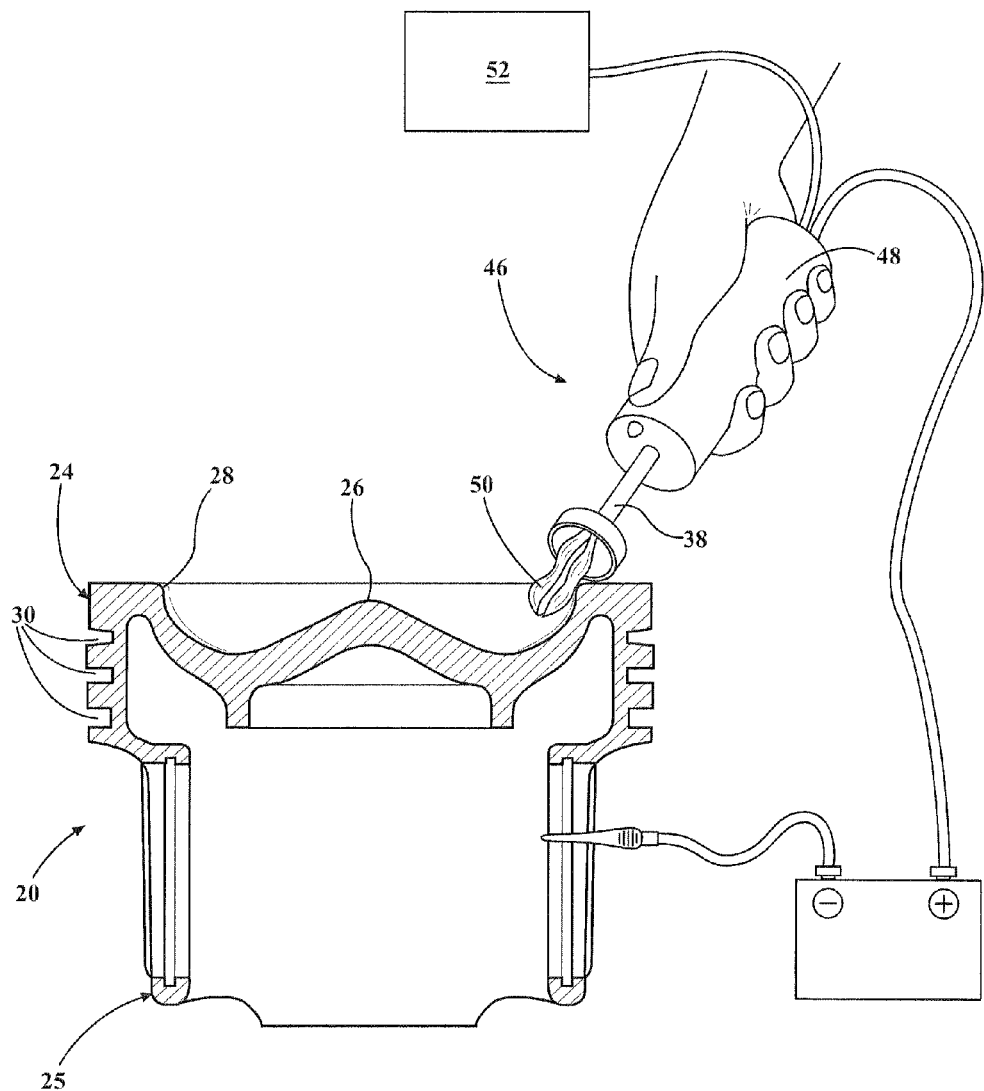
FIG. 3 is a schematic view of an exemplary applicator applying a coating to a piston.
Figure 4:
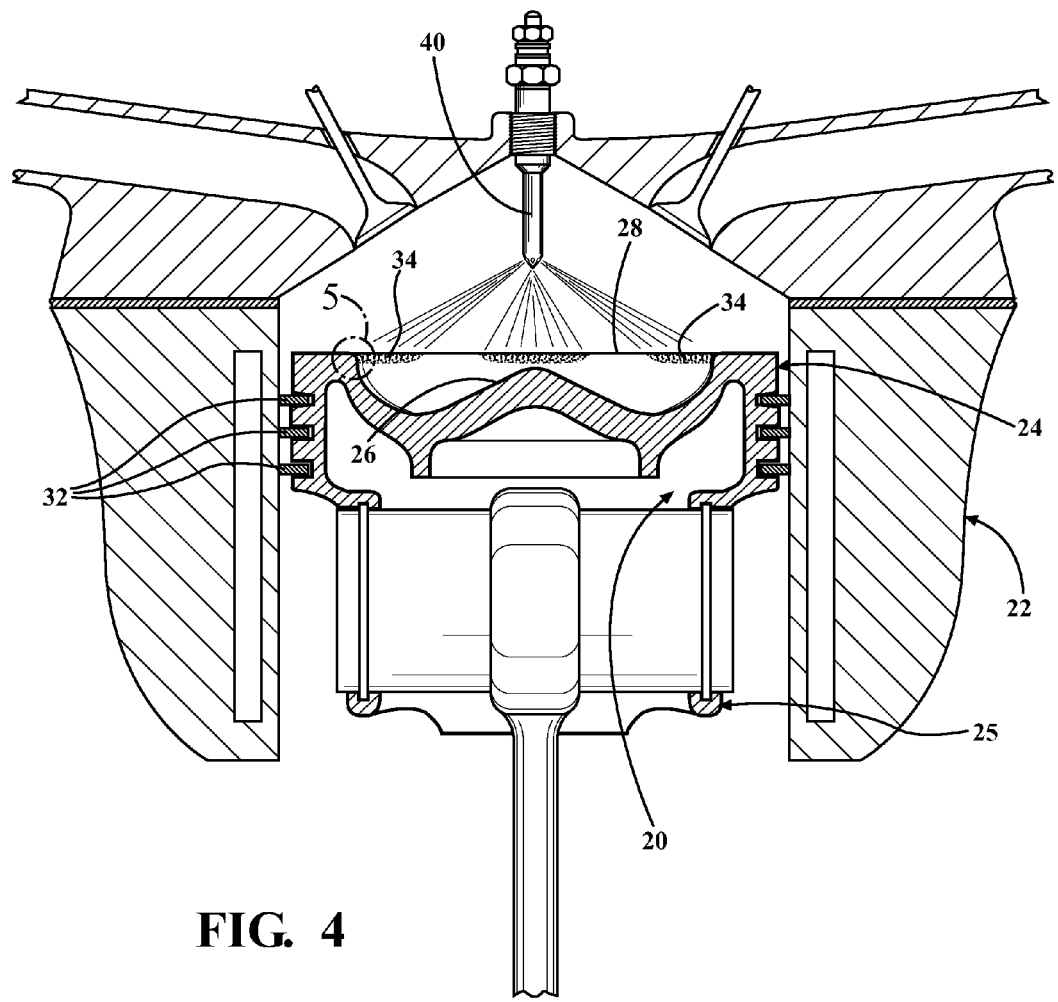
FIG. 4 is a schematic view of the exemplary piston of FIG. 1 disposed within a cylinder bore of an exemplary diesel engine.

Referring to the Figures, wherein like numerals indicate corresponding parts throughout the several views, an exemplary piston 20 for use in a diesel engine 22 and constructed according to one aspect of the present invention is generally shown in FIGS. 1 and 2 and is shown as installed in a diesel engine 22 in FIG. 4.

Referring to FIG. 1, the exemplary piston 20 is of a monobloc design, i.e. it includes a crown portion 24 and a skirt portion 25 which are integrally connected to one another to present a one-piece piston 20 body. The crown portion 24 includes a top, or combustion, surface having a combustion bowl 26 with a "Mexican hat" design and a combustion bowl rim area 28. However, it should be appreciated that the piston 20 could alternately be formed of two or more pieces articulatedly or non-articulatedly coupled to one another and could have a combustion bowl 26 with any desirable shape. The term "combustion bowl rim area 28" is used hereinafter to describe the upper edge of the combustion bowl 26 and the areas of the crown portion 24 substantially adjacent the upper edge of the combustion bowl 26 both inside of the combustion bowl 26 and surrounding the combustion bowl 26.

In order to withstand the pressures and temperatures of combustion in the combustion chamber of a diesel engine 22, at least the crown portion 24 of the piston 20 is formed primarily or entirely of steel, e.g. 4140H steel or microalloyed steel. The crown and skirt portions 24, 25 of the piston 20 body are preferably shaped through a precision (or investment) casting process and subsequently machined to its final form. However, it should be appreciated that these portions 24, 25 of the piston 20 may be formed and shaped through any suitable process including, for example, forging or machining from a billet. As with conventional pistons, the exemplary piston 20 also includes a plurality of ring grooves 30 for receiving piston rings 32 (shown in FIG. 4), which seal the piston 20 to a cylinder bore of the diesel engine 22.

A coating 34 is applied to the combustion surface of the crown portion 24 at substantially only the combustion bowl rim area 28 and only at specific locations along the combustion bowl rim area 28. The coating 34 is substantially entirely of one or more noble or refractory metals (such as rhenium, gold, platinum, iridium, palladium, osmium, silver, rhodium and ruthenium), thereby protecting the coated portions of the base steel material of the crown portion 24 from oxidation. Specifically, the coating 34 is substantially only applied to the combustion surface at the combustion bowl rim area 28.

Referring now to FIG. 4, in the exemplary embodiment, the coated portions 34 of the combustion bowl rim area 28 are generally in line with a spray of diesel fuel from a fuel injector 40 when the piston 20 is at a top dead center position. As such, the coating 34 protects the portions of the piston 20 that would otherwise be the most susceptible to oxidation during operation of the engine. It should also be appreciated that the specific locations along the combustion bowl rim area 28 that are coated could depend upon the type of fuel injector 40 in the cylinder and its orientation relative to the piston 20 in the cylinder bore. Alternately, the coating 34 may be applied to the entire combustion bowl rim area 28 if desired.

The coating 34 most preferably includes rhenium (a refractory metal) for its high melting point temperature (approximately 3186° C.). This is advantageous because during operation of the diesel engine 22, the coating 34 is directly exposed to the temperatures of combustion. Additionally, rhenium is advantageous because it is resistant to chemical attack and is neither overly ductile nor overly brittle. However, it should be appreciated that the coating 34 may alternately include other noble and/or refractory metals. For example, it might be desirable to formulate the coating 34 of various combinations of rhenium, ruthenium, palladium, osmium, iridium, platinum, rhodium, gold, silver, cobalt and nickel.

Locating the coating 34 substantially only on the combustion bowl rim area 28 is advantageous because it provides the piston 20 with sufficient resistance to oxidation in a cost effective manner since the amount of the noble metal used is kept to a minimum. Additionally, the coating 34 is preferably between one and one hundred microns (1-100 μm) in thickness. As such, the material costs for the improved oxidation resistance are very small. It should be appreciated that the specific portions of the combustion bowl rim area 28 coated with the noble metal could vary based on, for example, the number of fuel injectors 40 per cylinder of the engine, the types of fuel injectors 40, the orientations of the fuel injectors 40 relative to the piston 20 and the geometry of the piston 20. The remainder of the combustion surface of the piston 20 may be uncoated or may be coated with one or more materials that are less costly than the noble metal coating 34.

Figure 5:
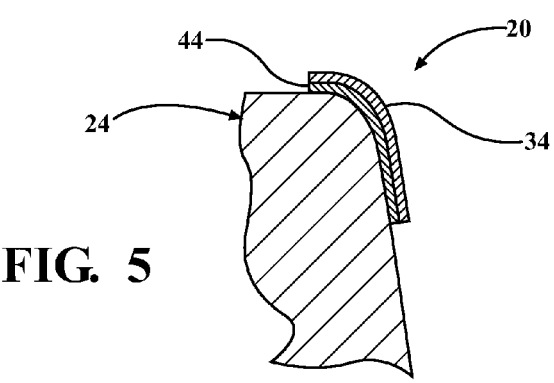
FIG. 5 is a cross-sectional and enlarged view of the exemplary piston of FIG. 4 and centered around an area coated with the metal and with the thickness of the coating being exaggerated.

Before applying the coating 34 to the crown portion 24, the crown portion 24 should be thoroughly cleaned and activated. This is performed preferably with a voltage of between ten and fifteen Volts (10-15 V) and may include an acid activator and intermediate rinsing steps. Additionally, as best shown in the exaggerated and enlarged view of FIG. 5, in the exemplary embodiment, a bond layer 44 is applied to the piston 20 between the steel base material of the crown portion 24 and the coating 34. The bond layer 44 is preferably of nickel and is approximately one to ten microns (1-10 μm) in thickness. The bond layer 44 may be applied through any suitable process. It should be appreciated that materials other than nickel could alternately be used for the bond layer 44 and that the bond layer 44 may have any desirable thickness. If desired, a mask (not shown) may be applied to the areas of the combustion surface that are not to receive the coating 34.

Referring now to FIG. 4, the noble metal and/or refractory metal coating of the exemplary embodiment is applied to the bond layer through a selective electrochemical metalizing process with a wand, pen or stylus applicator 46. The exemplary applicator 46 includes an anode portion 38 of graphite and attached to a handle 48. The anode portion 38 of the applicator 46 is preferably shaped similarly to the combustion bowl rim area 28 to more easily apply the coating 34 onto the piston 20. The tip of the anode portion 38 is covered with a fabric wrap 50, such as polyester, cotton or scotchbrite. In the exemplary embodiment, a pump 52 (such as a peristaltic pump 52) is in fluid communication with the applicator 46 for delivering a noble or refractory metal solution to the fabric wrap 50. Alternately, the tip of the applicator 46 could be periodically dipped into the noble or refractory metal solution.

Another aspect of the present invention is a method of making a piston 20 for a diesel engine 22. The method includes the steps of preparing a crown portion 24 of steel and having a combustion surface with a combustion bowl 26 and a combustion bowl rim area 28. The method continues with the step of selectively applying a coating 34 including at least one of a noble metal and a refractory metal to substantially only the combustion bowl rim area 28 of the crown portion 24. The application of the noble and/or refractory metal coating 34 may be through, for example, electrodepositing or a slurry paste which is dried then melted with a laser. However, it should be appreciated that any desirable process may be employed to apply the noble and/or refractory metal coating 34 onto the combustion bowl rim area 28 of the crown portion 24. The noble and/or refractory metal coating 34 may be substantially entirely of one or more of the elements rhenium, gold, platinum, iridium, palladium, osmium, silver, rhodium and ruthenium. The noble and/or refractory metal coating 34 is preferably applied onto the crown portion 24 to a thickness of between one and one hundred microns (1-100 μm). The method may also include the step of applying a bond layer 44 including nickel to the bowl rim before the step of selectively applying the noble metal coating 34 to the bowl rim and then applying the noble and/or refractory metal coating 34 onto the bond layer 44.

Yet another aspect of the present invention is another method of making a piston 20 for diesel engines 22. The method includes the step of preparing a crown portion 24 of steel and having a combustion surface with a combustion bowl 26 and a combustion bowl rim area 28. The method continues with electrodepositing a coating 34 including a noble metal and/or a refractory metal, and preferably being substantially only of one or more noble metals or refractory metals, onto substantially only the combustion bowl rim area 28 of the crown portion 24 with a wand applicator 46. During the electrodepositing step, the crown portion 24 may either be held stationary while the wand applicator 46 is moved relative to it or vice versa. The metal coating 34 may be substantially of one or more of the elements rhenium, gold, platinum, iridium, palladium, osmium, silver, rhodium and ruthenium.

Obviously, many modifications and variations of the present invention are possible in light of the above teachings and may be practiced otherwise than as specifically described while within the scope of the appended claims.

What is claimed is:

1. A piston for a diesel engine, comprising:
   a crown portion fabricated of steel and presenting a combustion surface having a combustion bowl with a bowl rim area; and
   a coating including at least one of a noble metal and a refractory metal selectively applied to at least one portion of said bowl rim area and wherein said coating is substantially only applied to said bowl rim area of said crown portion,
   wherein said at least one coated portion of said bowl rim area is disposed adjacent a portion of said bowl rim area which is not coated with said coating including at least one of a noble metal and a refractory metal.

2. The piston as set forth in claim 1 wherein said at least one coated portion of said bowl rim area is selected to be in line with a spray of fuel from an injector in the diesel engine when said piston is in a top dead center position.

3. The piston as set forth in claim 1 wherein said coating is substantially entirely of one or more of rhenium, gold, platinum, iridium, palladium, osmium, silver, rhodium and ruthenium.

4. The piston as set forth in claim 3 wherein the coating includes rhenium.

5. The piston as set forth in claim 1 wherein said coating is bonded to said steel crown portion through an electrodeposition process.

6. The piston as set forth in claim 1 wherein said coating is between one and one hundred microns (1-100 μm) thick.

7. The piston as set forth in claim 1 further including a bond layer disposed between said steel material of said bowl rim area and said coating.

8. The piston as set forth in claim 7 wherein said bond layer is substantially of nickel.

9. The piston as set forth in claim 1 wherein said portion of said bowl rim area which is not coated with said coating including at least one of a noble metal and a refractory metal is uncoated.

10. The piston as set forth in claim 1 wherein said portion of said bowl rim area which is not coated with said coating including at least one of a noble metal and a refractory metal is coated with a second coating different from said coating including at least one of a noble metal and a refractory metal.

11. The piston as set forth in claim 1 wherein said coating is formed substantially entirely of one or more noble or refractory metals.

12. The piston as set forth in claim 11 wherein said combustion surface surrounding said at least one coated portion is uncoated or coated with a second coating different from said coating formed substantially entirely of one or more noble or refractory metals.

13. A piston for a diesel engine, comprising:
 a crown portion fabricated of steel and presenting a combustion surface having a combustion bowl with a bowl rim area; and
 a coating including at least one of a noble metal and a refractory metal selectively applied to a plurality of portions of said bowl rim area and wherein said coating is substantially only applied to said bowl rim area of said crown portion, and
 wherein each of said coated portions of said bowl rim area is spaced from another one of said coated portions of said bowl rim area by a portion of said bowl rim area which is not coated with said coating including at least one of a noble metal and a refractory metal.

14. The piston as set forth in claim 13 wherein said portions of said bowl rim area coated with said coating including at least one of a noble metal and a refractory metal are each selected to be in line with a spray of fuel from an injector in the diesel engine when said piston is in a top dead center position.

* * * * *